United States Patent
Arslan et al.

(10) Patent No.: US 6,449,595 B1
(45) Date of Patent: Sep. 10, 2002

(54) FACE SYNTHESIS SYSTEM AND METHODOLOGY

(75) Inventors: Levent Mustafa Arslan, Istanbul (TR); David Thieme Talkin, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/266,011

(22) Filed: Mar. 11, 1999

Related U.S. Application Data

(60) Provisional application No. 60/077,565, filed on Mar. 11, 1998.

(51) Int. Cl.$^7$ ............................................. G10L 15/26
(52) U.S. Cl. .................... 704/235; 704/258; 704/249; 704/238; 434/185; 434/169; 434/118; 348/515
(58) Field of Search ................... 704/235, 249, 704/238, 270, 275, 277, 276, 260, 258; 434/185, 169, 118, 167; 348/515

(56) References Cited

U.S. PATENT DOCUMENTS

| | | | |
|---|---|---|---|
| 4,569,026 A | * 2/1986 | Best | 704/270 |
| 4,884,972 A | * 12/1989 | Gasper | 434/185 |
| 4,907,276 A | 3/1990 | Aldersberg | 381/36 |
| 5,608,839 A | * 3/1997 | Chen | 704/235 |
| 5,630,017 A | 5/1997 | Gasper et al. | 395/2.85 |
| 5,657,426 A | * 8/1997 | Waters et al. | 704/276 |
| 5,826,234 A | * 10/1998 | Lyberg | 704/277 |
| 5,878,396 A | * 3/1999 | Henton | 704/276 |
| 5,880,788 A | * 3/1999 | Bregler | 348/515 |
| 5,884,267 A | * 3/1999 | Goldenthal et al. | 704/276 |
| 6,112,177 A | * 8/2000 | Cossatto et al. | 704/260 |

FOREIGN PATENT DOCUMENTS

| | | |
|---|---|---|
| EP | 0 689 362 | 12/1995 |
| EP | 0 710 929 | 5/1996 |
| GB | 2 231 246 | 11/1990 |
| WO | WO 97/36288 | 10/1997 |

OTHER PUBLICATIONS

Chou et al., ("Speech recognition for image animation and coding", 1995, International Conference on Acoustics, Speech, and Signal Processing, 1995, ICASSP–95, May 1995, vol. 4, pp. 2253–2256).*

Williams et al., ("Frame rate and viseme analysis for multimedia applications", IEEEE First Workshop on Multimedia Signal processing, Jun. 1997, pp. 23–25).*

Gao et al., ("Synthesis of facial images with lip motion from several real views", Third International Conference on Automatic Face and Gesture Recognition Proceedings, Apr. 1998, pp. 181–186).*

Ostermann (Animation of synthetic faces in MPEG–4, Proceedings Computer Animation 98, Jun. 1998, pp. 49–55).*

McAllister et al., ("Automated lip–sync animation as a telecommunications aid for the hearing impaired", Proceedings 1998 IEEE 4th Workshop Interactive Voice Technology for telecommunications Applications, Sep. 1998, pp. 112–117).*

(List continued on next page.)

Primary Examiner—Vijay B Chawan
(74) Attorney, Agent, or Firm—Theodore M. Magee; Westman, Champlin & Kelly, P.A.

(57) ABSTRACT

A system and method for synthesizing a facial image, compares a speech frame from an incoming speech signal with acoustic features stored within visually similar entries in an audio-visual codebook to produce a set of weights. The audio-visual codebook also stores visual features corresponding to the acoustic features. A composite visual feature is generated as a weighted sum of the corresponding visual features, from which the facial image is synthesized. The audio-visual codebook may include multiple samples of the acoustic and visual features for each entry, which corresponds to a sequence of one or more phonemes.

11 Claims, 4 Drawing Sheets

OTHER PUBLICATIONS

Olives et al., ("Towards a high quality Finnish talking head", 1999 IEEE 3rd Workshop on Multimedia Signal Processing, Sep. 1999, pp. 433–437).*

Ezzat et al., ("Miketalk: a talking facial display based on morphing visemes", Proceedings Computer Animation 98, Jun. 1998, pp. 96–102).*

Yang et al., ("Automatic selection of visemes for image-based visual speech synthesis", 2000 IEEE International Conference on Multimedia and Expo, 2000, Aug. 2000, vol. 2, pp. 1081–1084).*

Faruquie et al., ("large vocabulary audio–visual speech recognition using active shape models", Proceedings, 15th international Conference on Pattern recognition, Sep. 2000, pp. 106–109).*

Sirovich, L. et al., "Low–Dimensional Procedure for the Characterization of Human Faces," Journal of the Optical Society of America, vol. 4, No. 3, pp. 519–524 (Mar. 1, 1987).

* cited by examiner

FACE SYNTHESIS SYSTEM AND METHODOLOGY

RELATED APPLICATIONS

This application claims the benefit of U.S. Provisional Application No. 60/077,565 entitled "Face Synthesis System and Methodology" filed on Mar. 11, 1998 by Levent M. Arslan and David Talkin, the contents of which are incorporated by reference herein.

This application contains subject matter related to the commonly assigned, co-pending PCT patent application No. PCT/US98/01538 entitled "Voice Conversion System and Methodology" filed on Jan. 27, 1998 naming Levent M. Arslan and David Talkin as inventors, the contents of which are incorporated by reference herein.

FIELD OF THE INVENTION

The present invention relates to audiovisual systems and, more particularly, to a system and methodology for face synthesis.

BACKGROUND OF THE INVENTION

Recently there has been significant interest in face synthesis. Face synthesis refers to the generation of a facial image in accordance with a speech signal, so that it appears to a viewer that the facial image is speaking the words uttered in the speech signal. There are many applications of face synthesis including film dubbing, cartoon character animation, interactive agents, and multimedia entertainment.

Face synthesis generally involves a database of facial images in correspondence with distinct sounds of a language. Each distinct sound of the language is referred to as a "phoneme," and during pronunciation of a phoneme, the mouth and lips of a face form a characteristic, visible configuration, referred to as a "viseme." Typically, the facial image database includes a "codebook" that maps each phoneme of a language to a corresponding viseme. Accordingly, the input speech text is segmented into phonemes, and the corresponding viseme for each phoneme is sequentially fetched from the database and displayed.

Realistic image quality is an important concern in face synthesis, and transitions from one sound to the next are particularly difficult to implement in a life-like manner because the mouth and lips are moving during the course of pronouncing a sound. In one approach, the mathematical routines are employed to interpolate a series of intermediate images from one viseme at one phoneme to the next. Such an approach, however, can result in an unnatural or distorted appearance, because the movements from one mouth and lip configuration to another are often non-linear.

In general, it is practical to store only a restricted number of phoneme/viseme sequences in the codebook. For example, image quality may be improved by storing visemes for all the allophones of a phoneme. An allophone of a phoneme is a slight, non-contrastive variation in pronunciation of the phoneme. A similar issue occurs in applying a face synthesis system originally developed for one language to speech in another language, because the other language includes additional phonemes lacking in the original language. Furthermore, the precise shape of a viseme is often dependent on the neighboring visemes, and there has been some interest in using sequences of phonemes of a given length, such as diphones.

Augmenting the codebook for every possible allophone, foreign phoneme, and phoneme sequences with their corresponding visemes consumes an unacceptably large amount of storage. In a common approach, aliasing techniques are employed in which visemes for a missing phoneme or sequence of phoneme are replaced by existing visemes in the codebook. Aliasing, however, tends to introduce artifacts at the frame boundaries, thereby reducing the realism of the final image.

SUMMARY OF THE INVENTION

Accordingly, there exists a need for a face synthesis system and methodology that generates realistic facial images. In particular, there is a need for handling transitions from one viseme to the next with improved realism. Furthermore, a need exists for generating realistic facial images for sequences of phonemes that are missing the codebook or for foreign language phonemes.

These and other needs are addressed by a method and computer-readable medium bearing instructions for synthesizing a facial image, in which a speech frame from an incoming speech signal is compared against acoustic features stored within an audio-visual codebook to produce a set of weights. These weights are used to generate a composite visual feature based on visual features corresponding to the acoustic features, and the composite visual feature is then used to synthesize a facial image. Generating a facial image based on a weighted composition of other images is a flexible approach that allows for more realistic facial images.

For example, more realistic viseme transitions during the course of pronunciation may be realized by using multiple samples of the acoustic and visual features for each entry in the audio-visual codebook, taken during the course of pronouncing a sound. Visemes for foreign phonemes can be generated by combining visemes from a combination of audio-visual codebook entries that correspond to native phonemes. For context-sensitive audio-visual codebooks with a restricted number of phoneme sequences, a weighted combination of features from visually similar phoneme sequences allows for a realistic facial image to be produced for a missing phoneme sequence.

In one embodiment, both the aforementioned aspects are combined so that each entry in the audio-visual codebook corresponds to a phoneme sequence and includes multiple samples of acoustic and visual features. In some embodiments, the acoustic features may be implemented by a set of line spectral frequencies and the visual features by the principal components of a Karhunen-Loewe transform of face points.

Additional objects, advantages, and novel features of the present invention will be set forth in part in the description that follows, and in part, will become apparent upon examination or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and system for face synthesis are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
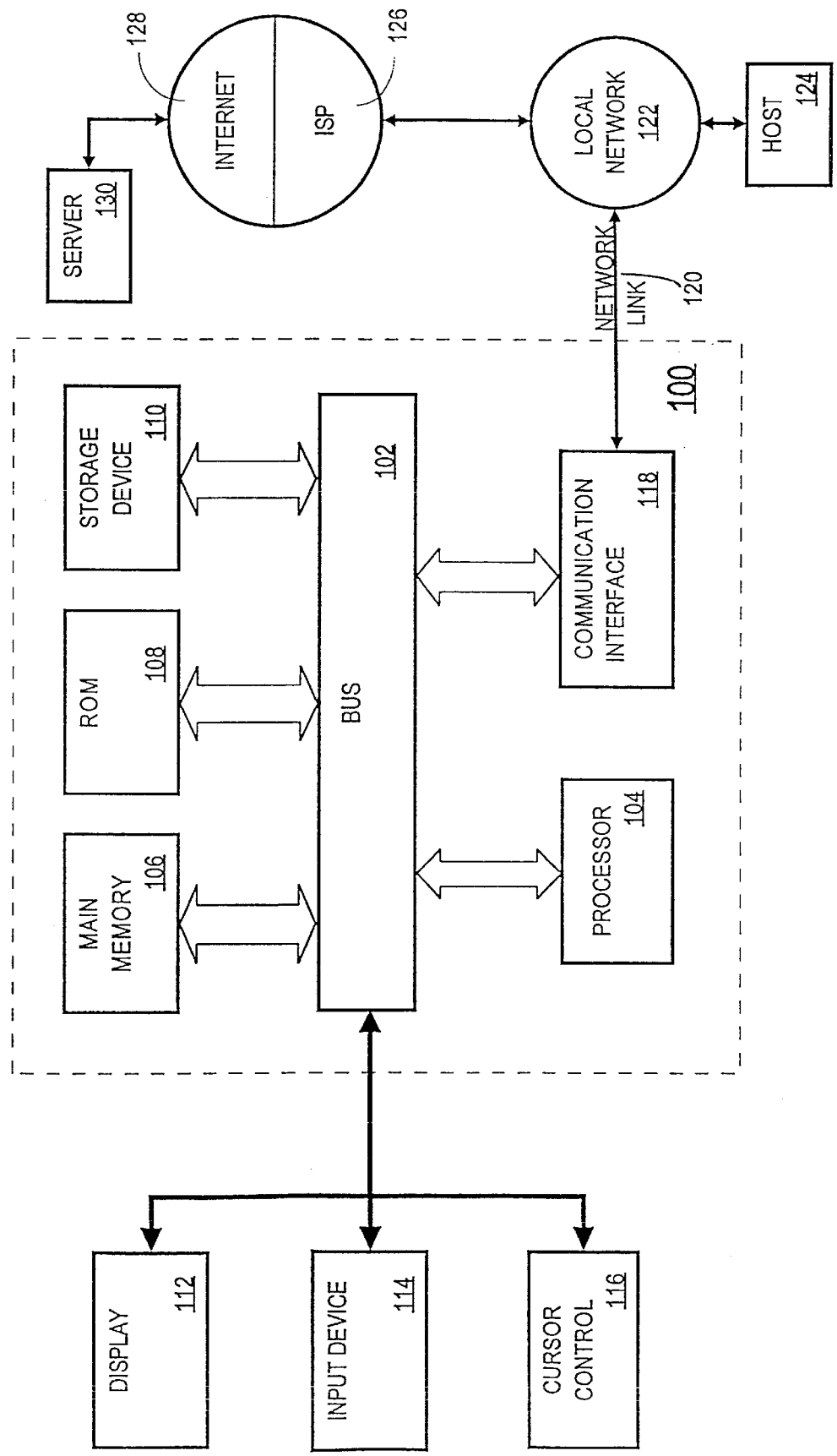
FIG. 1 schematically depicts a computer system that can implement the present invention.

FIG. 1 is a block diagram that illustrates a computer system 100 upon which an embodiment of the invention may be implemented. Computer system 100 includes a bus 102 or other communication mechanism for communicating information, and a processor (or a plurality of central processing units working in cooperation) 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 111, such as a cathode ray tube (CRT), for displaying information to a computer user. An input device 113, including alphanumeric and other keys, is coupled to bus 102 for communicating information and command selections to processor 104. Another type of user input device is cursor control 115, such as a mouse, a trackball, or cursor direction keys for communicating direction information and command selections to processor 104 and for controlling cursor movement on display 111. This input device typically has two degrees of freedom in two axes, a first axis (e.g., x) and a second axis (e.g., y), that allows the device to specify positions in a plane. For audio output and input, computer system 100 may be coupled to a speaker 117 and a microphone 119, respectively.

The invention is related to the use of computer system 100 for face synthesis. According to one embodiment of the invention, face synthesis is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 120 coupled to bus 102. Communication interface 120 provides a two-way data communication coupling to a network link 121 that is connected to a local network 122. Examples of communication interface 120 include an integrated services digital network (ISDN) card, a modem to provide a data communication connection to a corresponding type of telephone line, and a local area network (LAN) card to provide a data communication connection to a compatible LAN. Wireless links may also be implemented. In any such implementation, communication interface 120 sends and receives electrical, electromagnetic or optical signals that carry digital data streams representing various types of information.

Network link 121 typically provides data communication through one or more networks to other data devices. For example, network link 121 may provide a connection through local network 122 to a host computer 124 or to data equipment operated by an Internet Service Provider (ISP) 126. ISP 126 in turn provides data communication services through the world wide packet data communication network, now commonly referred to as the "Internet" 128. Local network 122 and Internet 128 both use electrical, electromagnetic or optical signals that carry digital data streams. The signals through the various networks and the signals on network link 121 and through communication interface 120, which carry the digital data to and from computer system 100, are exemplary forms of carrier waves transporting the information.

Computer system 100 can send messages and receive data, including program code, through the network(s), network link 121, and communication interface 120. In the Internet example, a server 130 might transmit a requested code for an application program through Internet 128, ISP 126, local network 122 and communication interface 118. In accordance with the invention, one such downloaded application provides for face synthesis as described herein. The received code may be executed by processor 104 as it is received, and/or stored in storage device 110, or other non-volatile storage for later execution. In this manner, computer system 100 may obtain application code in the form of a carrier wave.

Audio-visual Codebook

In accordance with an embodiment of the present invention, an off-line training phase is undertaken as a preliminary step to generate an audio-visual codebook and, preferably, a viseme similarity matrix 300. An audio-visual codebook is data structure that contains entries corresponding to a single phoneme or to a central phoneme in sequence of phonemes, called a "context phone." Each entry includes one or more acoustic features for the phoneme and the corresponding visual features of a related viseme.

The off-line training phase involves collecting data from a test subject by recording the synchronized speech and face point trajectories of the subject. According to one training approach, the subject is asked to utter words, phrases, and sentences for which an orthographic transcription is prepared. The recorded acoustic and visual data are then processed and stored in entries in the audio-visual codebook. The number of entries in the audio-visual codebooks will vary from implementation to implementation and generally depends on a desired trade-off between face synthesis quality and computational performance.

In one embodiment, the acoustic data is sampled at an appropriate frequency such as 16 kHz and automatically segmented using, for example, a forced alignment to a phonetic translation of the orthographic transcription within an HMM framework using Mel-cepstrum coefficients and delta coefficients as described in more detail in C. Wightman & D. Talkin, The Aligner User's Manual, Entropic Research Laboratory, Inc., Washington, D.C., 1994. Preferably, the sampled voice data is converted into line spectral frequencies, which can be estimated quite reliably and have a fixed range useful for real-time digital signal processing. The line spectral frequency values for the audio-visual codebook can be obtained by first determining the linear predictive coefficients $a_k$ for the sampled signal according to well-known techniques in the art. For example, specialized hardware, software executing on a general purpose computer or microprocessor, or a combination thereof, can ascertain the linear predictive coefficients by such techniques as square-root or Cholesky decomposition, Levinson-Durbin recursion, and lattice analysis introduced by Itakura and Saito.

In one embodiment, the visual data is obtained as 52 "face points" in three-dimensional space corresponding to points on the subject's face. Since each face point represents x, y, and z coordinates, the total number of face point parameters is 156, thereby constituting a 156-dimensional face point vector. An appropriate transformation technique, such as the Karhunen-Loewe transform, is applied to the face point vector to obtain its principal components. Since the points of a face are highly correlated, a significant reduction in dimensionality can be achieved with only minor distortion. A useful property of using principal components to represent visual features is that the principal components designate the directions that correspond to the most correlated movements. Therefore, modifying the weights of the principal components can be used to animate the underlying face with realistic motions.

Figure 2B:
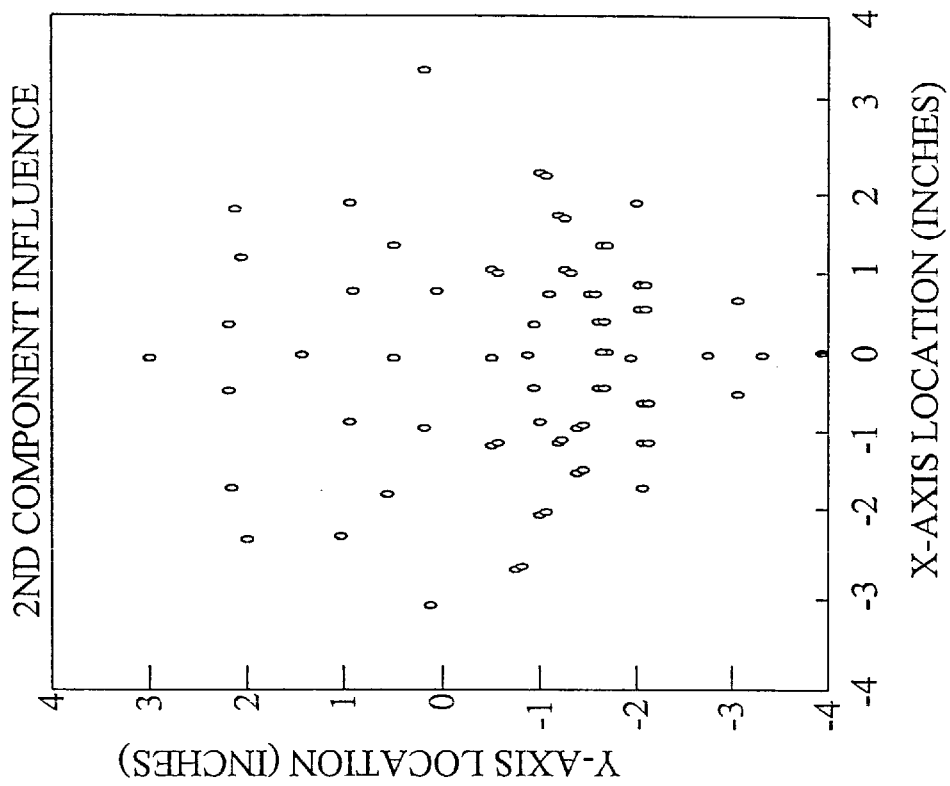
FIGS. 2(*a*) and 2(*b*) depict the influence of a modification to the first and second principal components, respectively, of face point data.
Figure 2A:
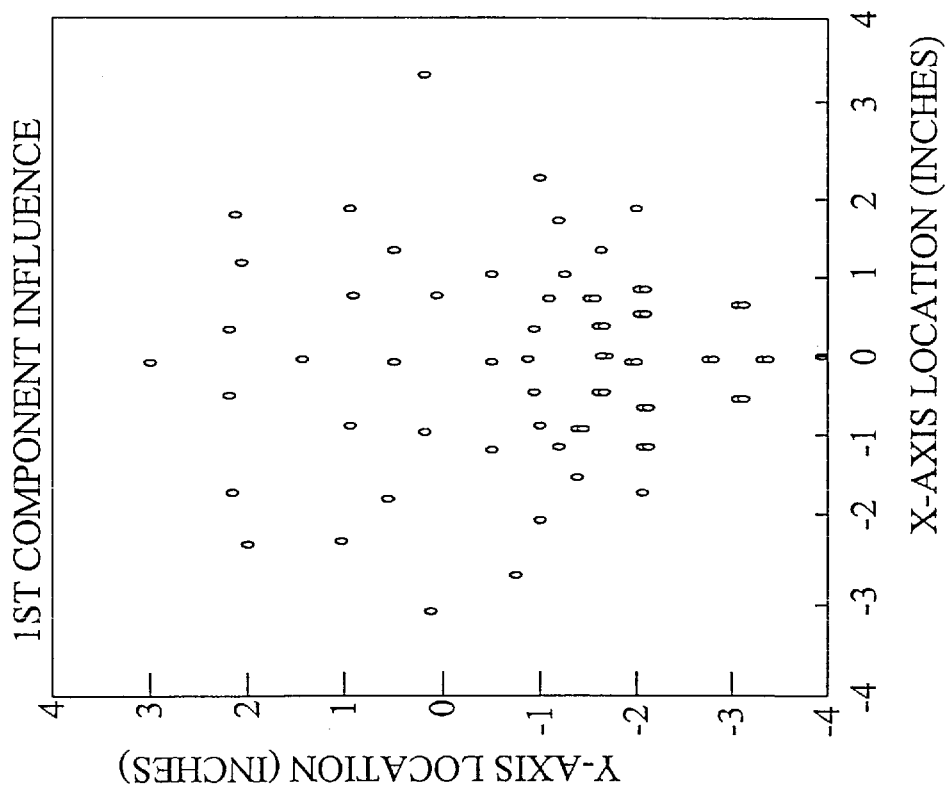

For example, the eigenvector with the largest eigenvalue was found to correspond with the movement of the lower jaw, which involves the largest set of correlated points in a speaker's face. Thus, modifying just the first principal component results in moving the lower lip and jaw trajectories. The second principal component was found to correspond with the movement of the sides of the mouth. FIGS. 2(*a*) and 2(*b*) depict the effect of adjusting only the first and second principal components of a face point vector, respectively, wherein dark curves represent an original face point trajectory and light curves represent the adjusted face point trajectory.

In accordance with one aspect, each phoneme segmented from the speech data is tagged with a "context-phone" symbol indicating the context of phoneme. Specifically, the context-phone symbol indicates the phoneme in the center and one or more neighboring phonemes on either side of the center phoneme in the speech data. For example, the phoneme /eh/ in the word "whenever" has a context-phone symbol of /w_eh_n_eh_v_axr_f/ that includes the three closest neighbors on either side. (The rightmost /f/ phoneme belongs to the following word that begins with an 'f' or 'ph'.) Use of context phones, which form a sequence of phonemes including a center phoneme and neighboring phonemes, allows appropriate context-specific visemes to be generated.

In accordance with another aspect, each phoneme in the training data is labeled with multiple, uniformly spaced time locations, for example at five locations, within the course of articulation of the phoneme. The acoustic and visual features, e.g. line spectral frequencies and Karhunen-Loewe principal components, are stored in the audio-visual codebook entry for the phoneme or context-phone. Use of multiple acoustic and visual features allows for a smooth and realistic sequence of visemes to be generated during the course of phoneme articulation.

Thus, the audio-visual codebook includes a number of entries corresponding to a phoneme or a center phoneme and including one or more acoustic features and one or more corresponding visual features. The audio-visual codebook can be used to generate facial images by comparing an incoming speech frame with the acoustic features in the entries to estimate weights for each of the compared acoustic features. The corresponding visual features are combined as a weighted sum to produce a composite visual feature, which is converted into a facial image. Although performing this process for all the entries in the audio-visual codebook results in a very high quality output, it is desirable improve the performance of this process.

Viseme Similarity Matrix

In one embodiment, the performance can be significantly improved if phonetic information is known a priori about the incoming speech data being synthesized into facial images. Specifically, several entries in the audio-visual codebook are selected whose phonemes or context-phones are most visually similar to the phoneme being pronounced in each incoming speech frame. Thus, the total number of entries that are compared with the acoustic feature of the incoming speech frame is reduced to only a few of the most visually similar entries. This selection reduces the computational overhead of the system and improves the overall performance of the face synthesis process.

Since, in practice, the training data will not include all possible context-phones of a given length (or all foreign phonemes and allophones), it is desirable to have some method of associating an unseen context-phone with visually similar entries in the audio-visual codebook. One visually similar measure is based on the Euclidean distance of the principal components of face data. This similarity measure can be automatically generated from the training data and stored in a viseme similarity matrix 300 by estimating an average principal component vector $m_k$ for each phoneme from the various instances of the phoneme in the training data, as follows:

$$m_k = \frac{1}{T}\sum_{t=1}^{T} p_{kt}, k \in 1 \ldots K, \quad (1)$$

where K represents the total number of phoneme in the language, T represent the total number of the kth phonemes in the training data, and $p_{kt}$ represents the tth principal component vector that is associated with the kth phoneme. Given the average principal component vectors $m_k$, the Euclidean distance between each pair of phonemes is calculated as:

$$d_{ik} = \|m_i - m_k\|, i, k \in 1 \ldots K, \quad (2)$$

Based on the calculated Euclidean distances, the viseme similarity measure $s_{ik}$ is derived as follows:

$$s_{ik} = e^{-50 d_{ik}}, i, k \in 1 \ldots K, \quad (3)$$

Figure 3:
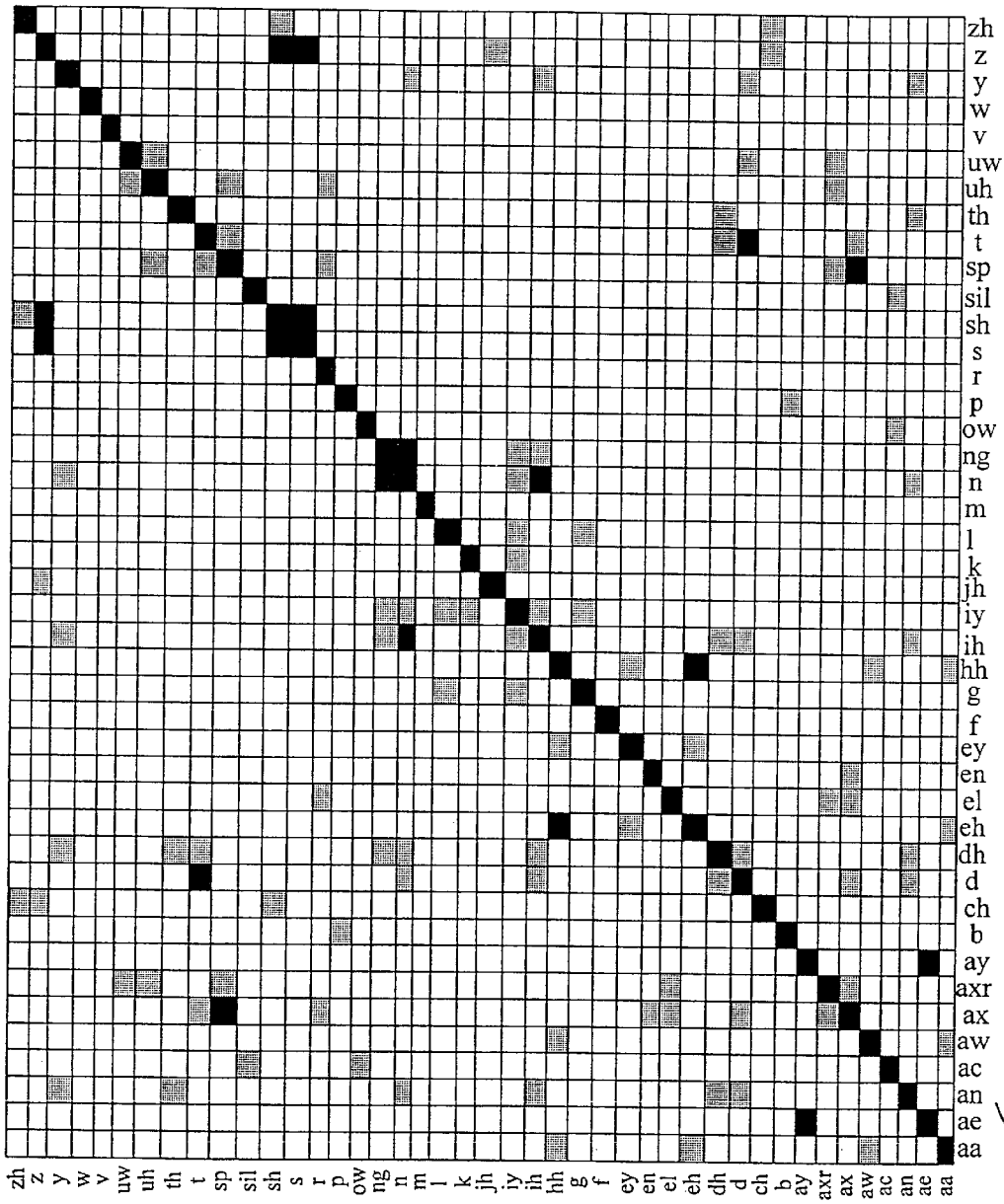
FIG. 3 depicts a viseme similarity matrix 300 corresponding to phoneme in American English.

One property of this formulation is that viseme similarity values $s_{ik}$ will range between 0 and 1. FIG. 3 depicts a gray scale image of one viseme similarity matrix 300 corresponding to phonemes of American English, wherein darker points represent a higher level of visual similarity. For example, the most visually similar phoneme to /b/ was identified to be /p/. In general, it has been found that entries in the viseme similarity matrix 300 agree with intuitive expectations.

The viseme similarity matrix 300 can be used directly to determine the visual similarity of two phonemes, but a more involved procedure is used to estimate a visual similarity measure between two context-phones representing a sequence of phonemes. Preferably, the center phoneme should have the highest influences with decreasing influence for the phonemes that are more remote from the center phoneme. One procedure to estimate the visual similarity of context-phones can be formulated as follows:

$$v_j = s_{cj} \sum_{i=1}^{C} 10^{-i}(S_{lij} + S_{rij}), j \in 1 \ldots L, \quad (4)$$

where C is the level context information (i.e. the number of neighboring phonemes on each side), L is the total number of content-phones in the audio-visual codebook, $s_{lij}$ is the similarity between the ith left phoneme of the subject context-phone and the jth context-phone in the audio-visual codebook, and $s_{rij}$ is the similarity between the ith right phoneme of the subject context-phone and the jth context-phone in the audio-visual codebook. Since the viseme similarity matrix 300 values $s_{ik}$ range between zero and one, equation (4) assures that a central phoneme match have the higher influence on the visual similarity measure.

Face Synthesis

When the audio-visual codebook has been prepared from the training data, facial images are synthesized in accordance with input speech. As mentioned hereinabove, performance of the face synthesis procedure can be significantly improved if phonetic information is known a priori about the input speech. In one embodiment, a phoneme sequence corresponding to the phonemes of the input speech is also input, which is used in conjunction with the viseme similarity matrix 300 to identify several of the most visually similar entries in the audio-visual codebook. The phoneme sequence can be prepared for the input speech based on methods known in the art, or, for synthetic speech, the phoneme sequence is prepared first and then the input speech is synthesized from the prepared phoneme sequence.

Figure 4:
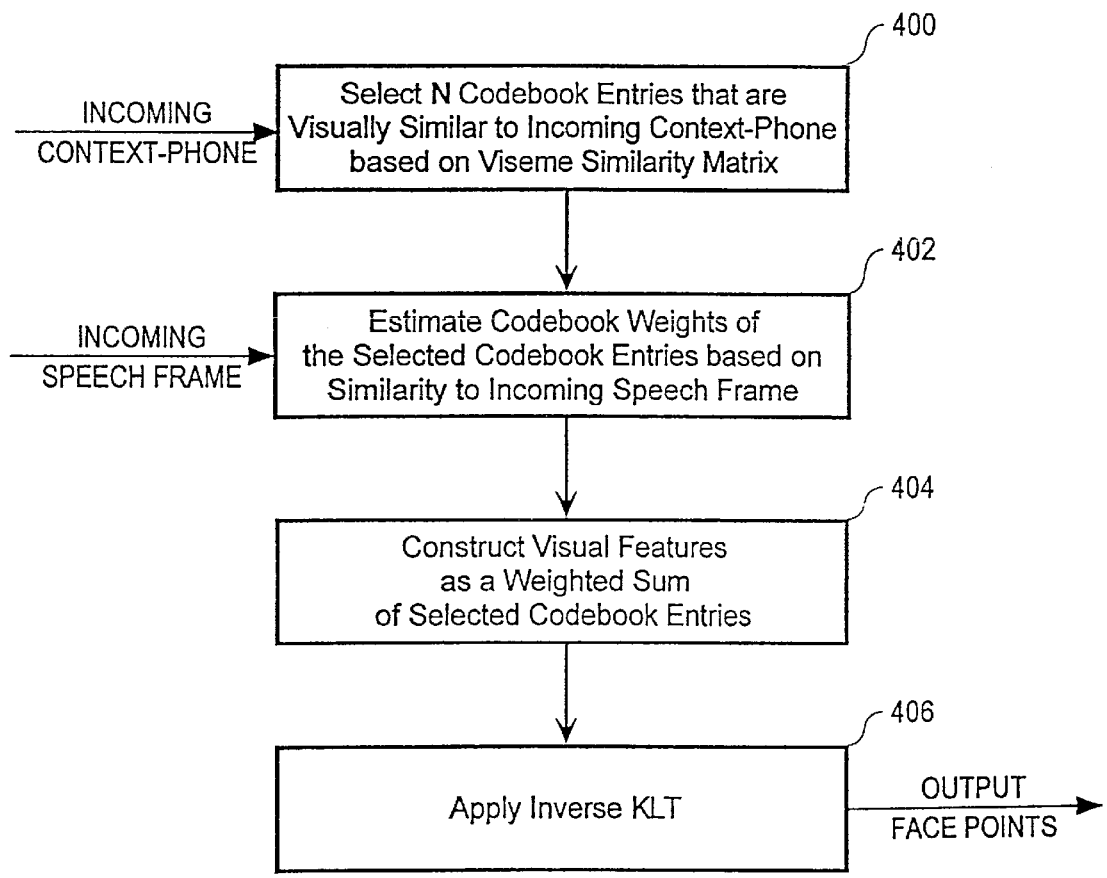
FIG. 4 is a flowchart illustrating a face synthesis process in accordance with one embodiment of the present invention.

FIG. 4 depicts a flowchart illustrating a face synthesis methodology in accordance with an embodiment of the present invention. At step 400, the phoneme sequence is compared with the entries of the audio-visual codebook to select several of the most visually similar entries. On one hand, if the audio-visual codebook was configured to store entries for context-phones, i.e. sequences of phonemes, then each incoming phoneme is combined with its neighboring phonemes to produce an incoming context-phone. For example, in a face synthesis system employing seven sequence context-phones, the current phoneme is concatenated with the three previous phonemes and the three following phonemes. The incoming context-phone is compared with each entry in the audio-visual codebook by applying equation (4), which is a weighted combination of individual visual similarity measures from accessing the viseme similarity matrix 300, to determine an overall visual similarity measure for the incoming context-phone. On the other hand, if the audio-visual codebook was configured to store entries for only a single phone, then the viseme similarity matrix 300 is consulted directly to obtain the visual similarity measure.

Based on the determined visual similarity measures, the N most visually similar entries of the audio-visual codebook are selected. The best value for N will vary from implementation to implementation, depending on factors such as the length of the phoneme sequence of the context-phones and the desired performance/realism tradeoff for a given set of training data. Generally, however, the value of N ranges from about four to about sixteen, and may in fact be a user-configurable parameter.

At step 402, the incoming speech frame is converted into acoustic features suitable for comparison with the acoustic features stored in the audio-visual codebook. For example, the incoming speech frame may be converted into line spectral frequencies and compared with a line spectral frequencies set stored in the audio-visual codebook. In some embodiment, a plurality of samples, such as five samples, are stored for each entry in the audio-visual codebook. The result of the acoustic feature comparison is a weight, wherein a higher weight is assigned for more acoustically similar samples. A variety of techniques for producing the weight based on the comparison may be employed but the present invention is not limited to any particular weight.

One weighting technique is described in the commonly assigned, co-pending PCT patent application No. PCT/US98/01538 entitled "Voice Conversion System and Methodology." As described therein, codebook weights $v_i$ are estimated by comparing the input line spectral frequency vector $w_k$ with each acoustic feature sample, $S_i$ in the audio-visual codebook to calculate a corresponding distance $d_i$:

$$d_i = \sum_{k=1}^{P} h_k |w_k - S_{ik}|, \; i \in 1 \ldots L \quad (5)$$

where L is the codebook size. The distance calculation may include a weight factor $h_k$, which is based on a perceptual criterion wherein closely spaced line spectral frequency pairs, which are likely to correspond to formant locations, are assigned higher weights:

$$h_k = \frac{e^{-0.05|K-k|}}{\min(|w_k - w_{k-1}|, |w_k - w_{k+1}|)}, \; k \in 1 \ldots P \quad (6)$$

where K is 3 for voiced sounds and 6 for unvoiced, since the average energy decreases (for voiced sounds) and increases (for unvoiced sounds) with increasing frequency. Based on the calculated distances $d_i$, the normalized codebook weights $v_i$ are obtained as follows:

$$v_i = \frac{e^{\gamma d_i}}{\sum_{l=1}^{L} e^{-\gamma d_l}}, \; i \in 1 \ldots L \quad (7)$$

where the value of $\gamma$ for each frame is found by an incremental search in the range of 0.2 to 2.0 with the criterion of minimizing the perceptual weighted distance between the approximated line spectral frequency vector $vS_k$ and the input line spectral frequency vector $w_k$. These weights may be further adjusted as also described in pending PCT patent application No. PCT/US98/01538.

At step 404, a composite visual feature is constructed from the weights and the corresponding visual features of the selected audio-visual codebook entries, for example, as a weighted sum or linear combination of the principal components of the facial data samples. For example, the composite visual feature may be calculated as follows:

$$\tilde{p} = \sum_{n=1}^{5N} v_n p_n. \quad (8)$$

In one embodiment, a plurality of visual features is stored for each entry in the audio-visual codebook at different points in time during the articulation of the sound corresponding to the entry. Thus, the weighted sum will include all the visual samples for the audio-visual codebook entry, thereby producing facial data that more realistically tracks the movement of the mouth and lips during speaking.

At step 406, the composite visual feature is converted into the desired facial data. For example, if principal components obtained from a Karhunen-Loewe transformation are used to represent the visual features, then an inverse Karhunen-Loewe transformation is applied on the composite principal components to produce face points as output. These face points can be converted to the facial image by known techniques.

Accordingly, a face synthesis system and methodology is described wherein realistic facial images are produced in accordance with an input speech signal. Specifically, a composite visual feature is generated from entries in an audio-visual codebook according to weights identified by comparing the incoming acoustic features with the audio-visual codebook acoustic features. Consequently, realistic output is attained for viseme transitions, for highly context-dependent situations, and even for foreign language phonemes without requiring the audio-visual codebook to store an enormous amount of training samples.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of synthesizing a facial image in accordance with a speech signal, comprising the steps of:

comparing a speech frame of the speech signal with a plurality of acoustic features within an audio-visual codebook to produce therefrom a plurality of weights;

generating a composite visual feature based on the weights and a plurality of visual features corresponding to the acoustic features; and synthesizing the facial image based on the composite visual feature.

2. The method of claim 1, wherein:

the audio-visual codebook contains entries each including a plurality of acoustic features and a plurality of corresponding visual features; and comparing the speech frame includes comparing the speech frame with the acoustic features from an entry within the audio-visual codebook.

3. The method of claim 1, wherein:

the audio-visual codebook contains entries each including an acoustic feature and a corresponding visual feature; and comparing the speech frame includes comparing the speech frame with acoustic features from a plurality of selected entries within the audio-visual codebook.

4. The method of claim 3, wherein the speech signal includes a sequence of speech frames correlated with a sequence of phonemes, said method further comprising:

determining a visual similarity measure between a phoneme in the sequence that is correlated to the speech frame and the entries in the audio-visual codebook, said entries in the audio-visual codebook corresponding to a phoneme; and selecting the selected entries from the audio-visual codebook based on the visual similarity measure.

5. The method of claim 3, wherein the speech signal includes a sequence of speech frames correlated with a sequence of phonemes, said method further comprising:

determining visual similarity measures between a phoneme in the sequence with neighboring phonemes thereof and the entries in the audio-visual codebook, said entries in the audio-visual codebook corresponding to a series of phonemes having a center phoneme with neighboring phonemes thereof; and selecting the selected entries in the audio-visual codebook based on the determined visual similarities.

6. The method of claim 5, wherein determining the visual similarity measures includes calculating Euclidean distances between each of sets of principal components of facial data corresponding to the phoneme in the sequence with the neighboring phonemes thereof and principle component samples of facial data corresponding to the center phoneme with the neighboring phonemes thereof.

7. The method of claim 5, wherein determining the visual similarity measures includes accessing a visual similarity matrix containing elements based on Euclidean distances between each of sets of principal components of facial data corresponding to the phoneme in the sequence with the neighboring phonemes thereof and principle component samples of facial data corresponding to the center phoneme with the neighboring phonemes thereof.

8. The method of claim 1, wherein the acoustic feature includes a line spectral frequencies set and the visual feature includes a set of principal components of facial data derived from face point samples.

9. A method of synthesizing a facial image in accordance with a speech signal, said speech signal including a sequence of speech frames correlated with a sequence of phonemes, said method comprising the steps of:

determining visual similarity measures between a phoneme in the sequence with neighboring phonemes thereof and entries in an audio-visual codebook, said entries in the audio-visual codebook corresponding to a series of phonemes having a center phoneme with neighboring phonemes thereof and including a plurality of acoustic features and a plurality of corresponding visual features;

selecting a plurality of the entries in the audio-visual codebook based on the determined visual similarities;

comparing a speech frame of the speech signal with the acoustic features from entries to produce therefrom a plurality of weights;

generating a composite visual feature based on the visual features of the entries and the weights; and synthesizing the facial image based on the composite visual feature.

10. A computer-readable medium bearing instructions for synthesizing a facial image in accordance with a speech signal, said instructions arranged, when executed by one or more processors, to cause the one or more processors to perform the steps of:

comparing a speech frame of the speech signal with a plurality of acoustic features within an audio-visual codebook to produce therefrom a plurality of weights;

generating a composite visual feature based on the weights and a plurality of visual features corresponding to the acoustic features; and synthesizing the facial image based on the composite visual feature.

11. A computer-readable medium bearing instructions for synthesizing a facial image in accordance with a speech signal, said speech signal including a sequence of speech frames correlated with a sequence of phonemes, said instructions arranged, when executed by one or more processors, to cause the one or more processors to perform the steps of:

determining visual similarity measures between a phoneme in the sequence with neighboring phonemes thereof and entries in an audio-visual codebook, said entries in the audio-visual codebook corresponding to a series of phonemes having a center phoneme with neighboring phonemes thereof and including a plurality of acoustic features and a plurality of corresponding visual features;

selecting a plurality of the entries in the audio-visual codebook based on the determined visual similarities;

comparing a speech frame of the speech signal with the acoustic features from entries to produce therefrom a plurality of weights;

generating a composite visual feature based on the visual features of the entries and the weights; and synthesizing the facial image based on the composite visual feature.

* * * * *